(12) United States Patent
Chakrabarti et al.

(10) Patent No.: US 12,043,368 B2
(45) Date of Patent: Jul. 23, 2024

(54) ROTATING AIRFOIL ASSEMBLY

(71) Applicant: General Electric Company, Schenectady, NY (US)

(72) Inventors: Suryarghya Chakrabarti, Mason, OH (US); Drew M. Capps, Avon, IN (US); Nicholas M. Daggett, Camden, ME (US); Gary W. Bryant, Loveland, OH (US)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 8 days.

(21) Appl. No.: 17/656,109

(22) Filed: Mar. 23, 2022

(65) Prior Publication Data
US 2023/0303238 A1    Sep. 28, 2023

(51) Int. Cl.
*B64C 11/00* (2006.01)
*F04D 29/66* (2006.01)

(52) U.S. Cl.
CPC .......... *B64C 11/008* (2013.01); *F04D 29/668* (2013.01); *F05D 2260/96* (2013.01)

(58) Field of Classification Search
CPC ...... F01D 5/00; F04D 29/668; F05D 2260/96; B64C 11/008
See application file for complete search history.

(56) References Cited

U.S. PATENT DOCUMENTS

| | | | |
|---|---|---|---|
| 1,833,751 A * | 11/1931 | Kimball | F01D 5/16 416/232 |
| 7,024,744 B2 | 4/2006 | Martin et al. | |
| 7,147,437 B2 | 12/2006 | Burdgick et al. | |
| 8,225,506 B2 | 7/2012 | Chivers et al. | |
| 9,121,288 B2 | 9/2015 | Campbell et al. | |
| 10,697,303 B2 * | 6/2020 | Blaney | F01D 25/12 |
| 10,914,320 B2 * | 2/2021 | Twelves, Jr. | F01D 5/16 |
| 11,142,307 B2 | 10/2021 | Mazet et al. | |
| 11,598,215 B1 * | 3/2023 | Barker | F01D 5/187 |
| 2007/0036658 A1 | 2/2007 | Morris | |
| 2009/0155082 A1 | 6/2009 | Duong et al. | |
| 2022/0098985 A1 * | 3/2022 | Chakrabarti | F02C 3/04 |

FOREIGN PATENT DOCUMENTS

| EP | 1544411 B1 | 2/2015 |
|---|---|---|
| WO | 1999032789 A1 | 7/1999 |

OTHER PUBLICATIONS

Daniel A. Russell "The Dynamic Vibration Absorber" Acoustics and Vibration Animations, https://www.acs.psu.edu/drussell/Demos/absorber/DynamicAbsorber.html, as viewed on Feb. 16, 2022.

"Mass Vibration Absrober.m4v", Dec. 6, 2012, https://www.youtube.com/watch?v=bqJadkufes4, as viewed on Feb. 16, 2022.

Tim Southerton "Eccentric Mass Dynamic Vibratory Absorber", Feb. 5, 2014, https://www.youtube.com/watch?v=2_TjQoyV5RE, as viewed on Feb. 16, 2022.

* cited by examiner

*Primary Examiner* — Sabbir Hasan
(74) *Attorney, Agent, or Firm* — Venable LLP; David D. Leege; Michele V. Frank

(57) ABSTRACT

A rotating airfoil including a body and a vibration absorber located within the body. The body has a root end and a tip. The rotating airfoil has a natural frequency, and the vibration absorber has a natural frequency. The natural frequency of the vibration absorber is different than the natural frequency of the rotating airfoil.

19 Claims, 8 Drawing Sheets

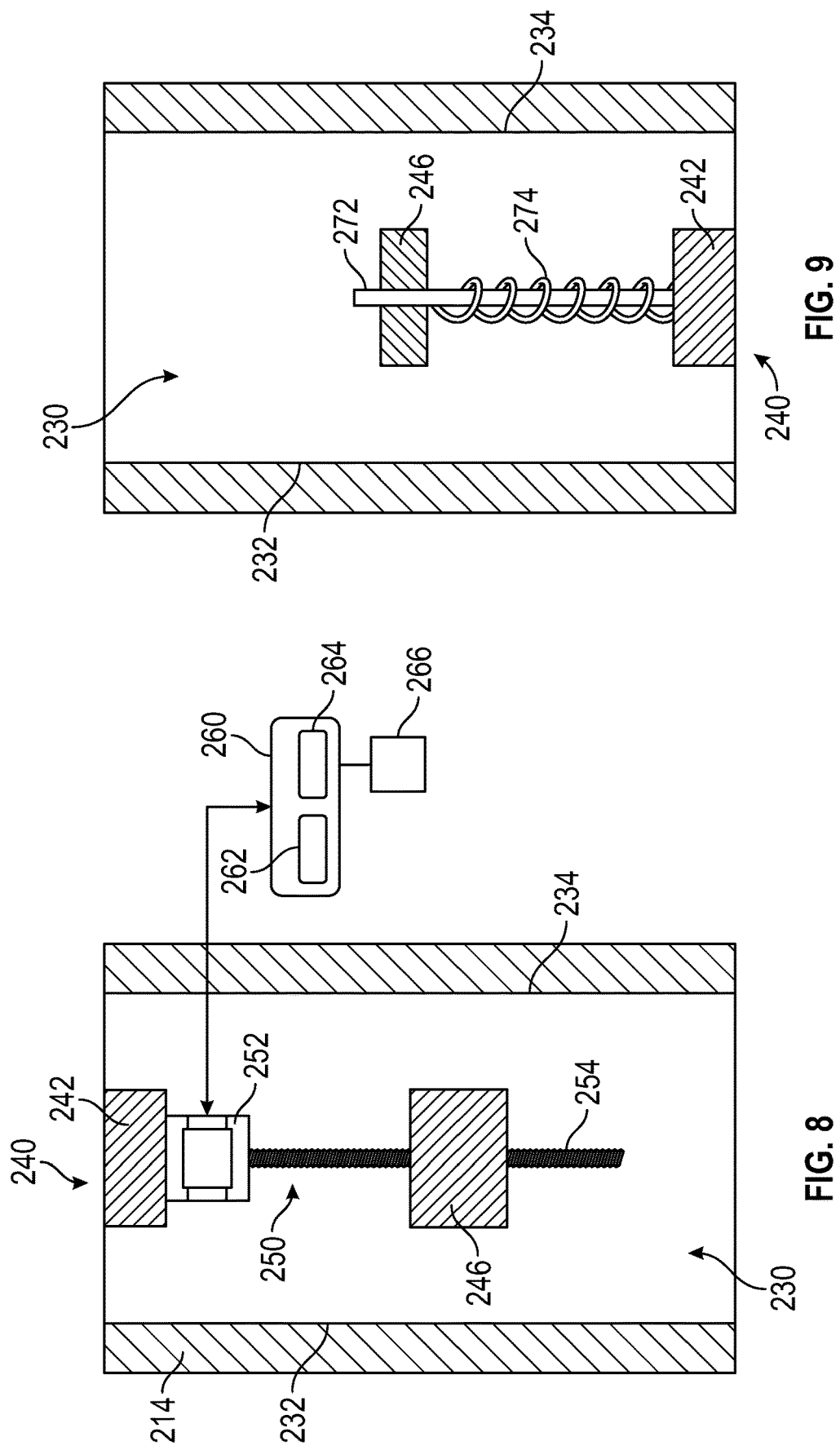

ROTATING AIRFOIL ASSEMBLY

TECHNICAL FIELD

The present disclosure relates to a rotating airfoil assembly, particularly, a rotating airfoil assembly for an engine producing thrust for an aircraft, such as a fan or a propeller.

BACKGROUND

The thrust used to move an aircraft through the air may be produced by a plurality of airfoils rotating about a central axis, such as, for example, the fan blades of a fan for an unducted single fan engine or the propellers on a propeller driven aircraft. As the fan or the propeller rotates, some of the blades are traveling in a downward direction and others are traveling in an upward direction. When the aircraft is flying level, air flows into the fan or the propeller in an axial direction of the fan or the propeller, and the downward traveling blades and the upward traveling blades produce an equal amount of thrust. But, when the aircraft has an angle of attack, the air flows into the fan or the propeller with a non-axial component and the downward traveling blades produce a different amount of thrust than the upward traveling blades. For example, when the aircraft is pitched upward, such as during takeoff, the downward traveling blades produce a greater amount of thrust than the upward traveling blades, resulting in asymmetric loading of the fan blades or the propeller. Thus, in one rotation, the rotating airfoil (fan blade or propeller) is subjected to differential loads (a 1P load) resulting in a cyclic loading condition for the rotating airfoil. Among other things, these cyclic loads can subject the rotating airfoil to fatigue stresses and strains.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 8 is a detail view, showing detail 8 in FIG. 7, of the adjustable vibration absorber of FIG. 7.

FIG. 9 is a schematic view of adjustable vibration absorber according to another embodiment of the present disclosure.

DETAILED DESCRIPTION

Figure 1:
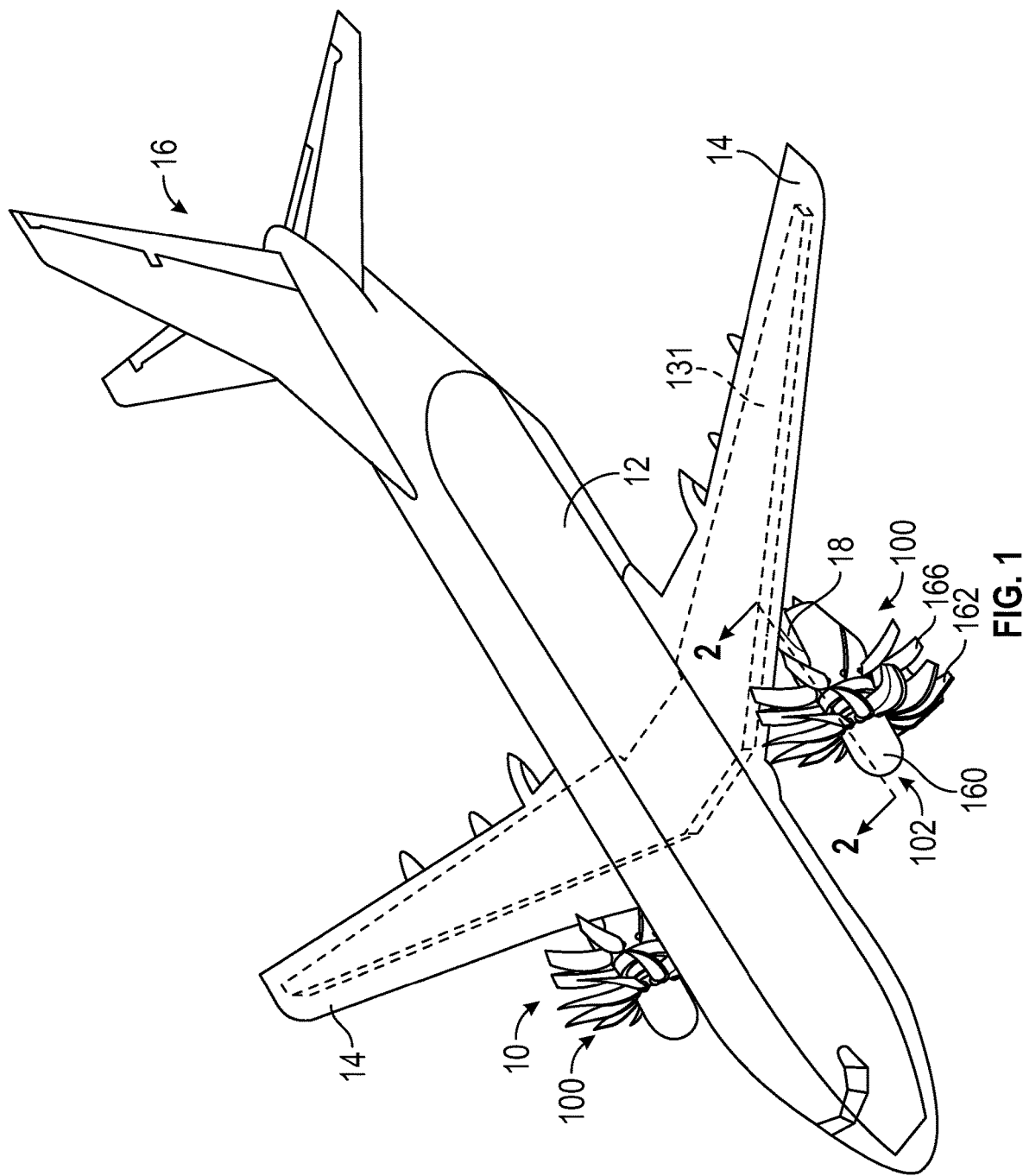
FIG. 1 is a schematic perspective view of an aircraft having unducted single fan engines with a rotating airfoil according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second," may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

As noted above, a rotating airfoil, such as the fan blades of a fan for a turbofan engine or the propellers on a propeller driven aircraft, may be subjected to differential loading during rotation (1P loading) when the rotation axis, about which the rotating airfoil rotates, is angled (such as pitched upward or pitched downward) relative to the flow of air into the fan or the propeller. This cyclic loading is an excitation frequency that may result in vibration of the rotating airfoil (1P excitation). In embodiments discussed herein, the rotating airfoils include a vibration absorber that is tuned to reduce the vibrations caused by this 1P excitation, and thereby reduces fatigue and other stresses and strains on the rotating airfoil.

The rotating airfoils discussed herein are suitable for use with rotating airfoil assemblies used to produce thrust for fixed wing aircraft, and, in particular, for open rotor engines such as propellers or unducted fan engines. FIG. 1 is a perspective view of an aircraft 10 that may implement various preferred embodiments. The aircraft 10 includes a fuselage 12, a pair of wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are unducted single fan engines that are each capable of selectively generating a propulsive thrust for the aircraft 10. The amount of propulsive thrust may be controlled at least in part based on a volume of fuel provided to the unducted single fan engines via a fuel system 130 (see FIG. 2). An aviation turbine fuel in the embodiments discussed herein is a combustible hydrocarbon liquid fuel, such as a kerosene-type fuel, having a desired carbon number. The fuel is stored in a fuel tank 131 of the fuel system 130. As shown in FIG. 1, at least a portion of the fuel tank 131 is located in each wing 14 and a portion of the fuel tank 131 is located in the fuselage 12 between the wings 14. The fuel tank 131, however, may be located at other suitable locations in the fuselage 12 or the wing 14. The fuel tank 131 may also be located entirely within the fuselage 12 or the wing 14. The fuel tank 131 may also be separate tanks instead of a single, unitary body, such as, for example, two tanks each located within a corresponding wing 14.

Figure 2:
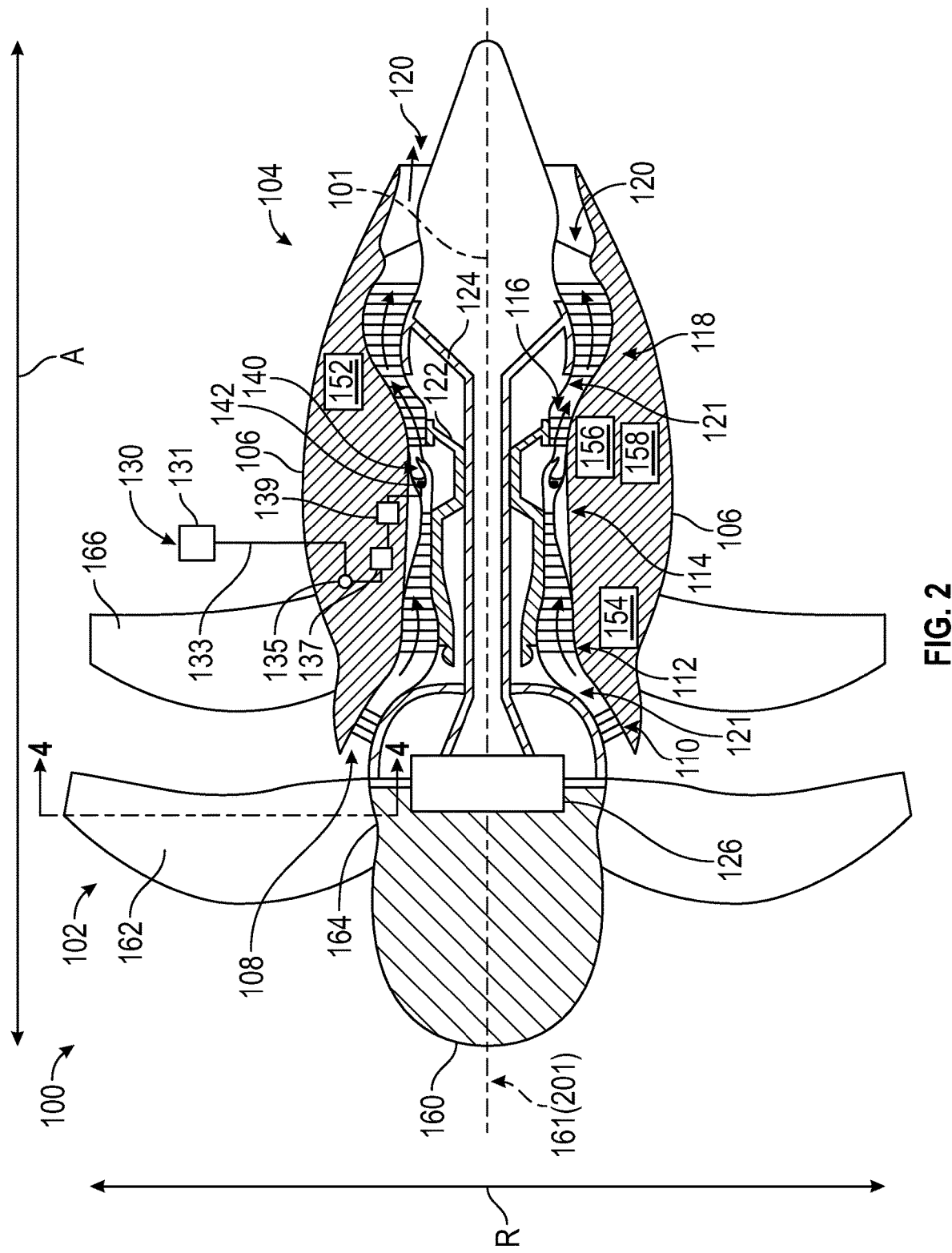
FIG. 2 is a schematic, cross-sectional view, taken along line 2-2 in FIG. 1, of one of the unducted single fan engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. As noted above, the engine 100 is an unducted single fan engine. The unducted single fan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the longitudinal centerline 101. The unducted single fan engine 100 includes a fan section 102 and a turbomachine 104 disposed downstream from the fan section 102.

The turbomachine 104 depicted in FIG. 2 includes a tubular outer casing 106 (also referred to as a housing or nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the inlet 108 to the jet exhaust nozzle section 120. The turbomachine 104 further includes one or more drive shafts. More specifically, the turbomachine 104 includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The unducted single fan engine 100, more specifically, the turbomachine 104, is operable with the fuel system 130 and receives a flow of fuel from the fuel system 130. The fuel system 130 includes a fuel delivery assembly 133 providing the fuel flow from the fuel tank 131 to the unducted single fan engine 100, and, more specifically, to a plurality of fuel nozzles 142 that inject fuel into a combustion chamber of a combustor 140 of the combustion section 114. The fuel delivery assembly 133 includes tubes, pipes, conduits, and the like, to fluidly connect the various components of the fuel system 130 to the unducted single fan engine 100. The fuel tank 131 is configured to store the hydrocarbon fuel, and the hydrocarbon fuel is supplied from the fuel tank 131 to the fuel delivery assembly 133. The fuel delivery assembly 133 is configured to carry the hydrocarbon fuel between the fuel tank 131 and the unducted single fan engine 100 and, thus, provides a flow path (fluid pathway) of the hydrocarbon fuel from the fuel tank 131 to the unducted single fan engine 100.

The fuel system 130 includes at least one fuel pump fluidly connected to the fuel delivery assembly 133 to induce the flow of the fuel through the fuel delivery assembly 133 to the unducted single fan engine 100. One such pump is a main fuel pump 135. The main fuel pump 135 is a high-pressure pump that is the primary source of pressure rise in the fuel delivery assembly 133 between the fuel tank 131 and the unducted single fan engine 100. The main fuel pump 135 may be configured to increase a pressure in the fuel delivery assembly 133 to a pressure greater than a pressure within the combustion chamber of the combustor 140.

The fuel system 130 also includes a fuel metering unit 137 in fluid communication with the fuel delivery assembly 133. Any fuel metering unit 137 may be used including, for example, a metering valve. The fuel metering unit 137 is positioned downstream of the main fuel pump 135 and upstream of a fuel manifold 139 configured to distribute fuel to the fuel nozzles 142. The fuel system 130 is configured to provide the fuel to the fuel metering unit 137, and the fuel metering unit 137 is configured to receive fuel from the fuel tank 131. The fuel metering unit 137 is further configured to provide a flow of fuel to the unducted single fan engine 100 in a desired manner. More specifically, the fuel metering unit 137 is configured to meter the fuel and to provide a desired volume of fuel, at, for example, a desired flow rate, to the fuel manifold 139 of the unducted single fan engine 100. The fuel manifold 139 is fluidly connected to the fuel nozzles 142 and distributes (provides) the fuel received to the plurality of fuel nozzles 142, where the fuel is injected into the combustion chamber of the combustor 140 and combusted. Adjusting the fuel metering unit 137 changes the volume of fuel provided to the combustion chamber and, thus, changes the amount of propulsive thrust produced by the unducted single fan engine 100 to propel the aircraft 10.

The unducted single fan engine 100 also includes various accessory systems to aid in the operation of the unducted single fan engine 100 and/or an aircraft 10. For example, the unducted single fan engine 100 may include a main lubrication system 152, a compressor cooling air (CCA) system 154, an active thermal clearance control (ATCC) system 156, and a generator lubrication system 158, each of which is depicted schematically in FIG. 2. The main lubrication system 152 is configured to provide a lubricant to, for example, various bearings and gear meshes in the compressor section, the turbine section, the HP shaft 122, and the LP shaft 124. The lubricant provided by the main lubrication system 152 may increase the useful life of such components and may remove a certain amount of heat from such components through the use of one or more heat exchangers. The compressor cooling air (CCA) system 154 provides air from one or both of the HP compressor 112 or the LP compressor 110 to one or both of the HP turbine 116 or the LP turbine 118. The active thermal clearance control (ATCC) system 156 acts to minimize a clearance between tips of turbine blades and casing walls as casing temperatures vary during a flight mission. The generator lubrication system 158 provides lubrication to an electronic generator (not shown), as well as cooling/heat removal for the electronic generator. The electronic generator may provide electrical power to, for example, a startup electrical motor for the unducted single fan engine 100 and/or various other electronic components of the unducted single fan engine 100 and/or an aircraft 10. The lubrication systems for the unducted single fan engine 100 (e.g., the main lubrication system 152 and the generator lubrication system 158) may use hydrocarbon fluids, such as oil, for lubrication, in which the oil circulates through inner surfaces of oil scavenge lines.

The fan section 102 of the unducted single fan engine 100 includes a plurality of fan blades 162, also referred to herein as rotating airfoils, coupled to a fan hub 164 (or disk). The fan blades 162 and the fan hub 164 are rotatable, together, circumferentially about a rotation axis 161, which, in this embodiment, is coincident with the longitudinal centerline (axis) 101. In this embodiment, a spinner 160 is connected to the fan hub 164, and the spinner 160 rotates with respect to outer casing 106. Each of the fan blades 162 is an airfoil and, more specifically, a rotating airfoil. The fan blades 162, together with the fan hub 164, in this embodiment, comprise a rotating airfoil assembly.

The turbomachine 104 of this embodiment is a torque producing system that generates torque to rotate the fan blades 162. The turbomachine 104 is configured to operate (e.g., to rotate) the fan hub 164. The fan hub 164 may be coupled to a shaft, and, more specifically, the LP shaft 124, of the turbomachine 104, and the LP shaft 124 rotates the fan blades 162 and the fan hub 164. In some embodiments, the LP shaft 124 may be coupled to the fan hub 164 in a direct drive configuration, but, in this embodiment, the LP shaft 124 is coupled to a gearbox 126 that, in turn, transmits a rotational (torsional) force to rotate the fan hub 164.

Coupled to the outer casing 106 may be one or more outlet guide vanes 166. In this embodiment, the outlet guide vanes 166 are positioned aft of the fan blades 162. In this embodiment, the outer casing 106 is stationary such that the one or more outlet guide vanes 166 do not rotate around the longitudinal centerline 101 and are, thus, stationary with respect to rotation about the longitudinal centerline 101. Although the outlet guide vanes 166 are stationary with respect to the longitudinal centerline 101, the outlet guide vanes 166 are capable of being rotated or moved with respect to the outer casing 106 to guide the air flow in a particular direction.

During operation of the unducted single fan engine 100, air flows from the left side of FIG. 2 toward the right side of FIG. 2. A portion of the air flow may flow past the fan blades 162 and the outlet guide vanes 166. A portion of the air flow may enter the outer casing 106 through the annular inlet 108 as the air flowing through core air flowpath 121 to be mixed with the fuel for combustion in the combustor 140 and exit through the jet exhaust nozzle section 120. As noted above, the outlet guide vanes 166 may be movable with respect to the outer casing 106 to guide the air flow in a particular direction. Each outlet guide vane 166 may be movable to adjust the lean, pitch, sweep, or any combination thereof, of the outlet guide vane 166.

In the embodiment shown in FIGS. 1 and 2, a forward end or a front portion of the outer casing 106 includes the one or more fan blades 162 and the one or more outlet guide vanes 166. In other embodiments, the one or more fan blades 162 and the one or more outlet guide vanes 166 may have a different arrangement with respect to the outer casing 106. For example, the one or more fan blades 162 and the one or more outlet guide vanes 166 may be located on an aft end or a rear portion of the outer casing 106, such as coupled to a rear portion of the outer casing 106. More specifically, the one or more fan blades 162 and the one or more outlet guide vanes 166 may be coupled to a rear portion of the outer casing 106.

In other embodiments, an engine according to this disclosure may be configured to have stationary vanes positioned forward of the rotating fan blades 162 (thus, the vanes 166 are inlet guide vanes). Although the outlet guide vanes 166 may be stationary and not rotate about the longitudinal centerline 101, as described above, the one or more outlet guide vanes 166 may rotate counter to the one or more fan blades 162 such that the one or more outlet guide vanes 166 are contra-rotating rotors in a contra-rotating open rotor (CROR) engine. Either pusher configurations, where the rotors are forward of the pylon 18, or puller configurations, where the rotors are aft of the pylon 18 are contemplated. In such a case, the contra-rotating rotors may also be rotating airfoils that are part of a rotating airfoil assembly, as discussed further below.

The example of the rotating airfoil assembly shown in FIGS. 1 and 2 is the fan blades 162, together with the fan hub 164, but the embodiments discussed herein may be applicable to other rotating airfoil assemblies. Other rotating airfoil assemblies include, for example, a propeller assembly, such as a propeller assembly for a turboprop engine. Such a propeller assembly may include a plurality of propeller blades that are coupled to and extend outwardly from a propeller shaft. The propeller assembly of a turboprop engine may be driven by a turbomachine (similar to the turbomachine 104 discussed above) to rotate about a rotation axis of the propeller shaft. The propeller blades are airfoils, more specifically, rotating airfoils, and the propeller assembly is another example of a rotating airfoil assembly. The propeller assembly is an open rotor system that may also experience asymmetric loading on the propeller blades with the longitudinal centerline of the turboprop engine being angled (such as pitched upward or downward) relative to the flow of air into the propeller assembly.

The torque producing systems discussed above for the engine 100 shown in FIGS. 1 to 2 is turbomachine 104. Other suitable torque producing systems, however, may be used to rotate the rotating airfoils (e.g., fan blades 162) and rotating airfoil assemblies (e.g., fan hub 164 and fan blades 162). Other suitable torque producing systems include other engines, such as reciprocating engines, for example. Although the aircraft 10 shown in FIG. 1 is an airplane, the embodiments described herein may also be applicable to other aircraft 10, including, for example, other fixed-wing unmanned aerial vehicles (UAV). Further, although not depicted herein, in other embodiments, the embodiments discussed herein may be applicable to any rotating airfoils and rotating airfoil assemblies, such as, for example the blades of wind turbines.

Figure 3:
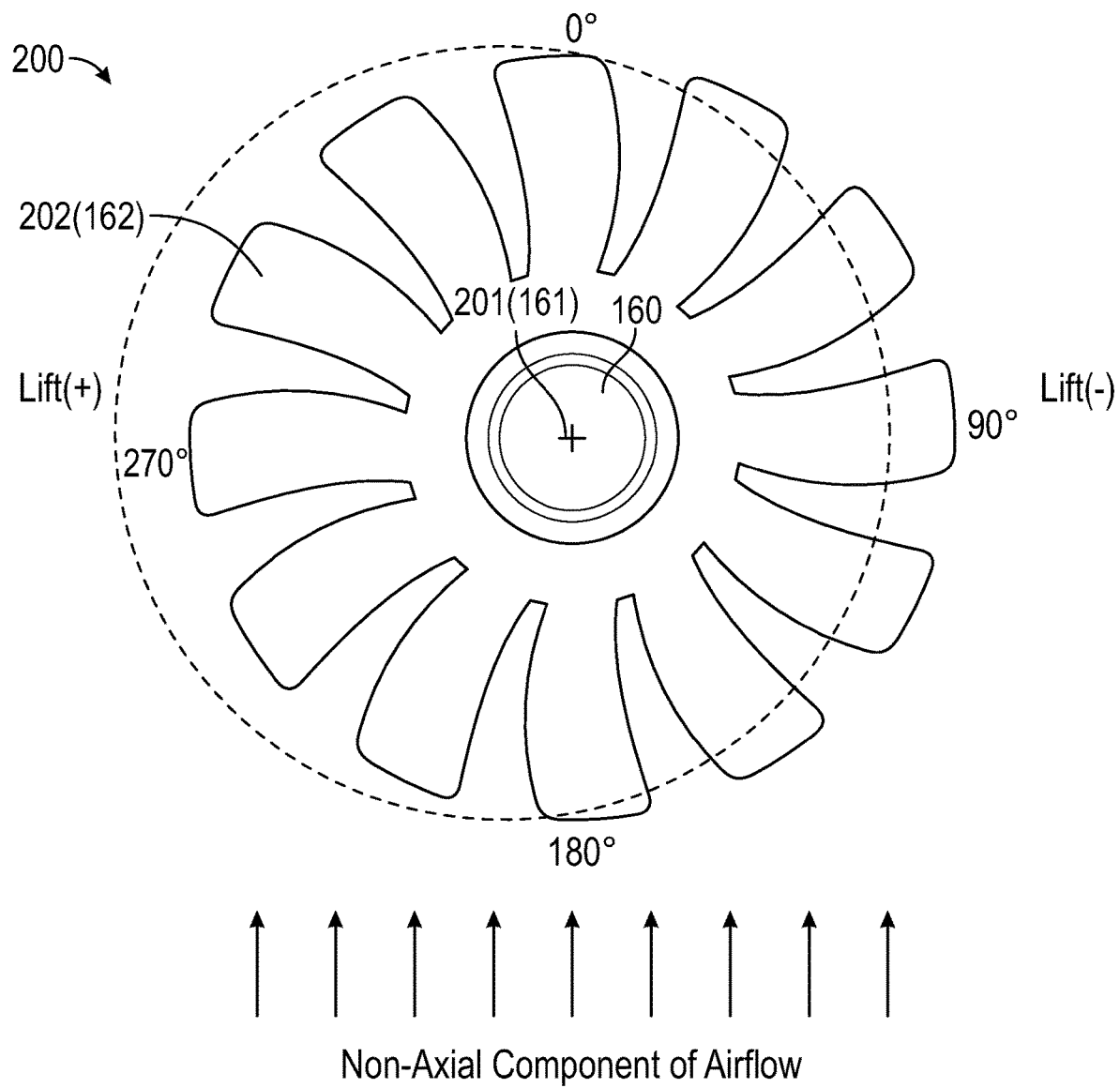
FIG. 3 is a front view of a fan (rotating airfoil assembly) of one of the unducted single fan engines of the aircraft shown in FIG. 1.

FIG. 3 shows a rotating airfoil assembly 200 including a plurality of rotating airfoils 202 according to an embodiment. The rotating airfoil assembly 200 depicted in FIG. 3 is includes the spinner 160 of the unducted single fan engine 100 of FIGS. 1 and 2, and FIG. 3 is a front view of the spinner 160. The rotating airfoils 202 (fan blades 162) of the rotating airfoil assembly 200 are rotating in a clockwise direction in FIG. 3 about a rotation axis 201 (rotation axis 161). To aid in the following discussion, angular positions of the rotating airfoils 202 and the rotating airfoil assembly 200 are given relative to the rotation axis 201, as shown in FIG. 3. The rotating airfoils 202 are, thus, rotating in a downward direction from zero degrees to one-hundred eighty degrees and in an upward direction from one-hundred eighty degrees to three hundred sixty degrees (zero degrees).

FIG. 3 illustrates the rotation axis 201 being angled (such as pitched upward or downward) relative to the flow of air into the rotating airfoil 202. More specifically, in FIG. 3, the rotation axis 201 is angled upward relative to the flow of air into the rotating airfoils 202 such as when the aircraft 10 (and, also, the longitudinal centerline 101 of the unducted single fan engine 100 of FIG. 1) is pitched upward during takeoff or climb. In such a condition, the rotating airfoil assembly 200 is subjected to a non-axial component of airflow that is in an upward direction (as depicted by the upward arrows). Each rotating airfoil 202 produces a similar amount of lift at the top (zero degrees) and the bottom (one hundred eighty degrees) of the rotation that the rotating airfoil 202 would produce if the rotating airfoil assembly 200 was not inclined. Each rotating airfoil 202, however, produces less lift when moving downward from the top (zero degrees) to the bottom (one hundred eighty degrees) and more lift when moving upward from the bottom (one hundred eighty degrees) to the top (zero degrees). This change in lift is schematically illustrated by the broken lines in FIG. 3. The lowest amount of lift produced by a rotating airfoil 202 as the rotating airfoil 202 makes one rotation is at ninety degrees, steadily increasing from that point to two hundred seventy degrees before steadily decreasing as the rotating airfoil 202 continues rotating. This may be referred to as once per revolution loading or 1P loading.

Figure 4A:
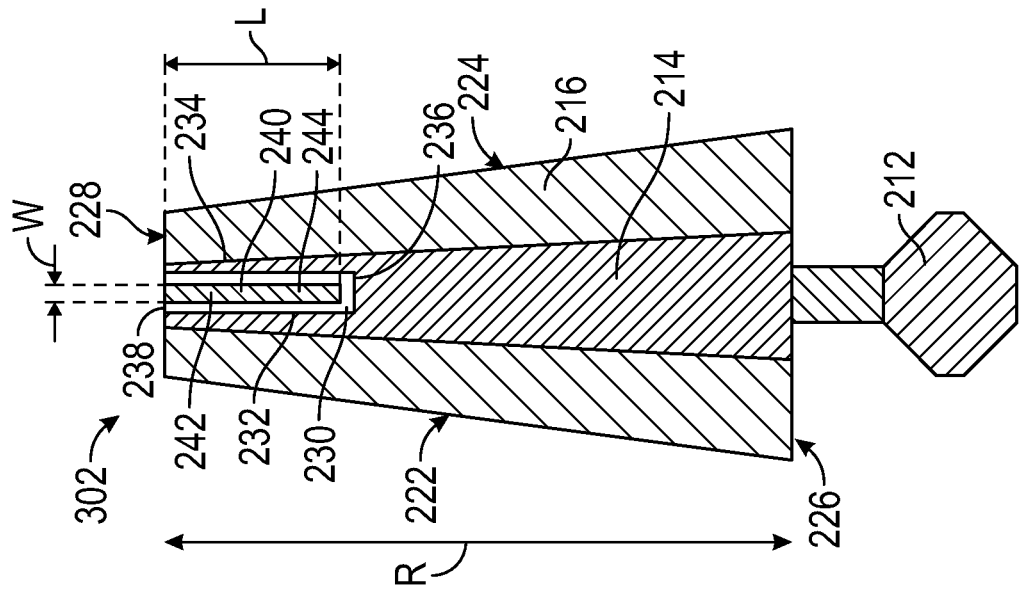
FIG. 4A is a schematic, cross-sectional view, taken along line 4-4 in FIG. 2, of a rotating airfoil according to an embodiment of the present disclosure.

FIG. 4A shows the rotating airfoil 202 of FIG. 3 according to an embodiment that may be used in the airfoil assemblies 200 described herein, such as the fan blade 162 of the unducted single fan engine 100. FIG. 4A is a schematic, cross-sectional view, taken along line 4-4 in FIG. 2. The rotating airfoil assembly 200 of this embodiment includes a root 212 that engages with the fan hub 164 and connects the rotating airfoil 202 to the fan hub 164. A spar 214 is connected to the root 212. The spar 214 provides the structural support for the rotating airfoil assembly 200. A skin (not shown) forms the exterior surface of the rotating airfoil assembly 200. The volume in the rotating airfoil assembly 200 between the spar 214 and the skin may be filled with, for example, a foam 216. The foam 216 is a light-weight, non-structural component of the rotating airfoil assembly 200 used to fill the void between the spar 214 and the skin. In this embodiment, the spar 214 and the foam 216 together form a body of the rotating airfoil 202. The rotating airfoil 202 includes a leading edge 222, a trailing edge 224, a root end 226, and a tip 228. The rotating airfoil 202 extends outwardly in a radial direction R (see also FIG. 2) of the rotating airfoil assembly 200 from the root end 226 to the tip 228. The rotating airfoil 202 has a longitudinal direction that is the radial direction R of the rotating airfoil assembly 200. The rotating airfoil 202 may have any suitable shape, including, for example, a cambered shape with a suction surface having a convex curvature and a pressure surface being generally flat.

The rotating airfoil 202 of this embodiment includes a cavity 230 and a vibration absorber 240 located within the cavity 230. The cavity 230 includes a plurality of walls defining the cavity 230. In this embodiment, the cavity 230 includes a leading wall 232, a trailing wall 234, a root wall 236, a tip wall 238, a suction-side wall (not shown) and a pressure-side wall (not shown), collectively referred to herein as the sidewalls of the cavity 230. The cavity 230 of this embodiment is elongated in the radial direction R of the rotating airfoil 202.

In the embodiment shown in FIG. 4A, the cavity 230 and the vibration absorber 240 are located within the spar 214. In some embodiments, such as the embodiment shown in FIG. 4A, the cavity 230 and the vibration absorber 240 are located closer to the tip 228 than to the root end 226, and may be formed on the outer half of the rotating airfoil 202 in the radial direction R.

The vibration absorber 240 of this embodiment is a cantilevered beam located within the cavity 230 and, similar to the cavity 230, is elongated in the radial direction R of the rotating airfoil 202. Although shown and described herein as a cantilevered beam, the vibration absorber 240 may have any suitable shape. The vibration absorber 240 includes an attached end 242 and a free end 244. The attached end 242 is opposite the free end 244 in the radial direction R of the rotating airfoil 202. The attached end 242 is attached to one of the sidewalls of the cavity 230, such as the tip wall 238. The free end 244 is not attached to the sidewalls of the cavity 230 or another part of the rotating airfoil 202. The vibration absorber 240 is sized, having a width W and a depth (in an out of the page), to have space (a gap) between the vibration absorber 240 and the sidewalls of the cavity 230 (excluding the sidewall of the cavity 230 to which the vibration absorber 240 is attached at the attached end 242), such as the leading wall 232, the trailing wall 234, the root wall 236, the suction-side wall (not shown) and the pressure-side wall (not shown). In addition, the vibration absorber 240 has a length L such that there is space (a gap) between the free end 244 and one of the walls of the cavity 230, such as the root wall 236. With the vibration absorber 240 being cantilevered and sized in such a manner, the free end 244 is free to vibrate within the cavity 230 when a vibration at an excitation frequency ($\omega_{exc}$) is applied to the rotating airfoil 202. In some embodiments, the free end 244 is configured to vibrate within the cavity 230 without contacting the walls of the cavity 230 when the rotating airfoil 202 is subjected to an excitation frequency (Were) that is different than the natural \ frequency of the rotating airfoil 202.

Figure 4B:
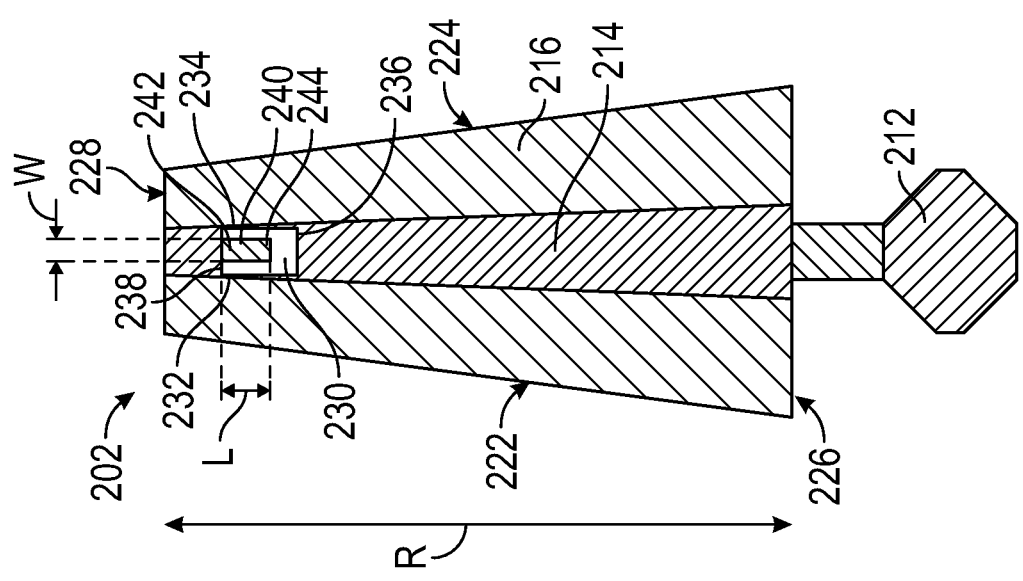
FIG. 4B is a schematic, cross-sectional view of a rotating airfoil according to another embodiment of the present disclosure.

FIG. 4B is a schematic, cross-sectional view of a rotating airfoil 302, a variation of the rotating airfoil 202 of FIG. 4A, according to another aspect of the disclosure herein. The rotating airfoil 302 is substantially similar to the rotating airfoil 202, therefore, like parts will be identified with like numerals. It should be understood that the description of like parts of the rotating airfoil 202 applies to the rotating airfoil 302 unless otherwise noted.

In some embodiments, such as the one shown in FIG. 4B, the cavity 230 may be machined into the spar 214 from the tip 228, and the vibration absorber 240 inserted into the cavity 230 from the tip 228. The spar 214 of this embodiment extends to the tip 228 and the cavity 230 is a bore formed in the spar 214 extending inward from the tip 228. In this embodiment, the attached end 242 is connected to the tip 228 of the rotating airfoil 302.

Figure 4C:
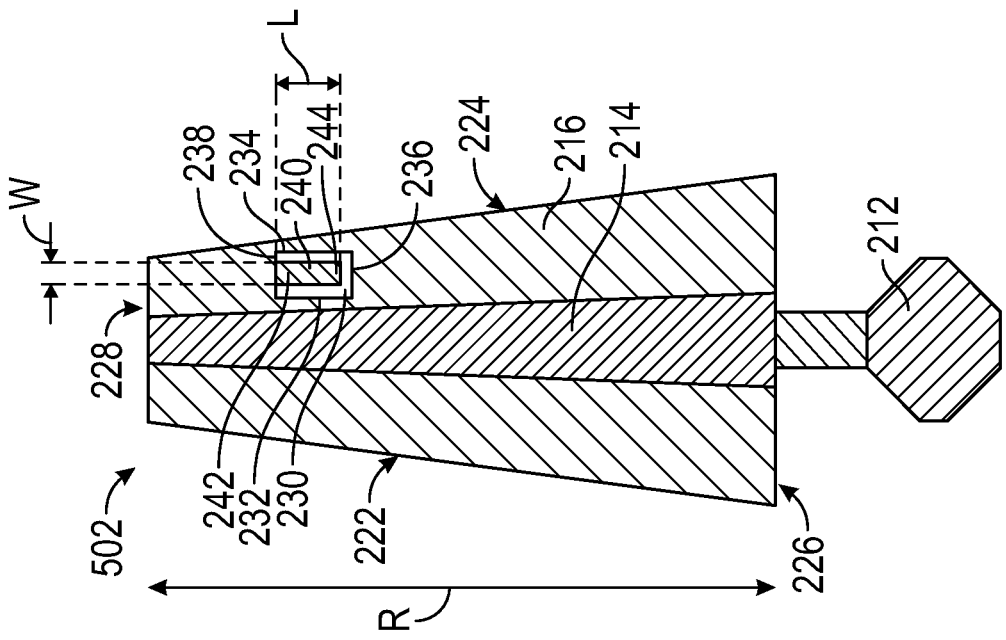
FIG. 4C is a schematic, cross-sectional view of a rotating airfoil according to another embodiment of the present disclosure.

FIG. 4C is a schematic, cross-sectional view of a rotating airfoil 402, a variation of the rotating airfoil 202 of FIG. 4A, according to yet another aspect of the disclosure herein. The rotating airfoil 402 is substantially similar to the rotating airfoil 202, therefore, like parts will be identified with like numerals. It should be understood that the description of like parts of the rotating airfoil 202 applies to the rotating airfoil 402 unless otherwise noted.

In the embodiment shown in FIG. 4C, the cavity 230 may be machined into the spar 214 through the root 212.

Figure 4D:
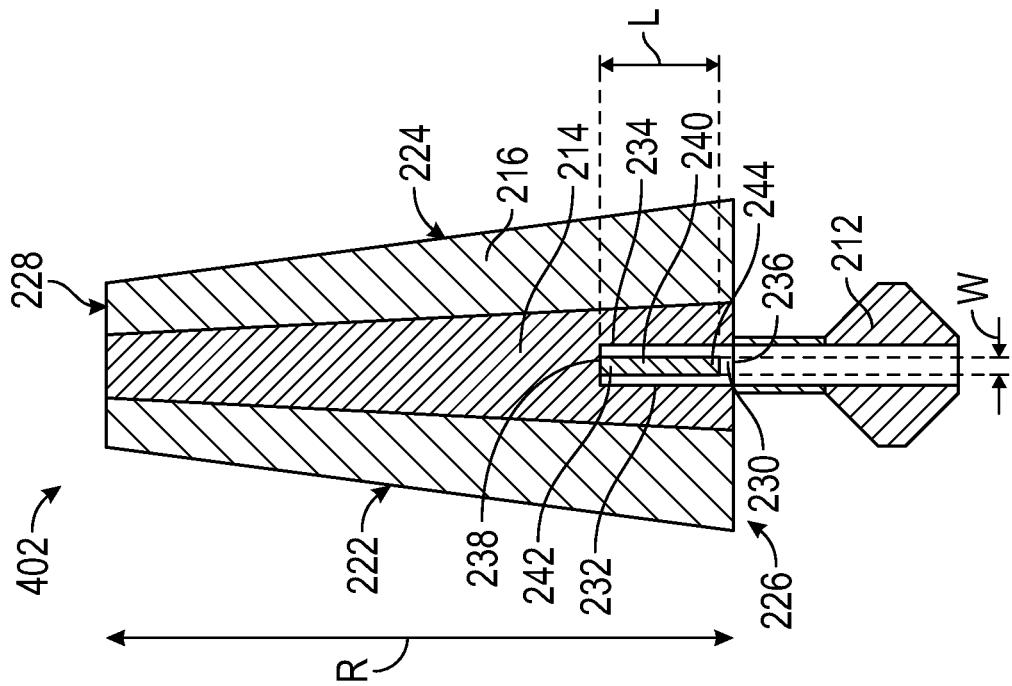
FIG. 4D is a schematic, cross-sectional view of a rotating airfoil according to another embodiment of the present disclosure.

FIG. 4D is a schematic, cross-sectional view of a rotating airfoil 502, a variation of the rotating airfoil 202 of FIG. 4A, according to still another aspect of the disclosure herein. The rotating airfoil 502 is substantially similar to the rotating airfoil 202, therefore, like parts will be identified with like numerals. It should be understood that the description of like parts of the rotating airfoil 202 applies to the rotating airfoil 502 unless otherwise noted.

In some embodiments, such as the one shown in FIG. 4D, the vibration absorber may be positioned in an alternate location within the rotating airfoil 502. Although the cavity 230 and the vibration absorber 240 may preferably be located in the spar 214 (as shown in FIGS. 4A, 4B, and 4C), the cavity 230 and the vibration absorber 240 may be located at other suitable locations within the rotating airfoil 502, including in the foam 216, as shown in FIG. 4D.

Figure 5:
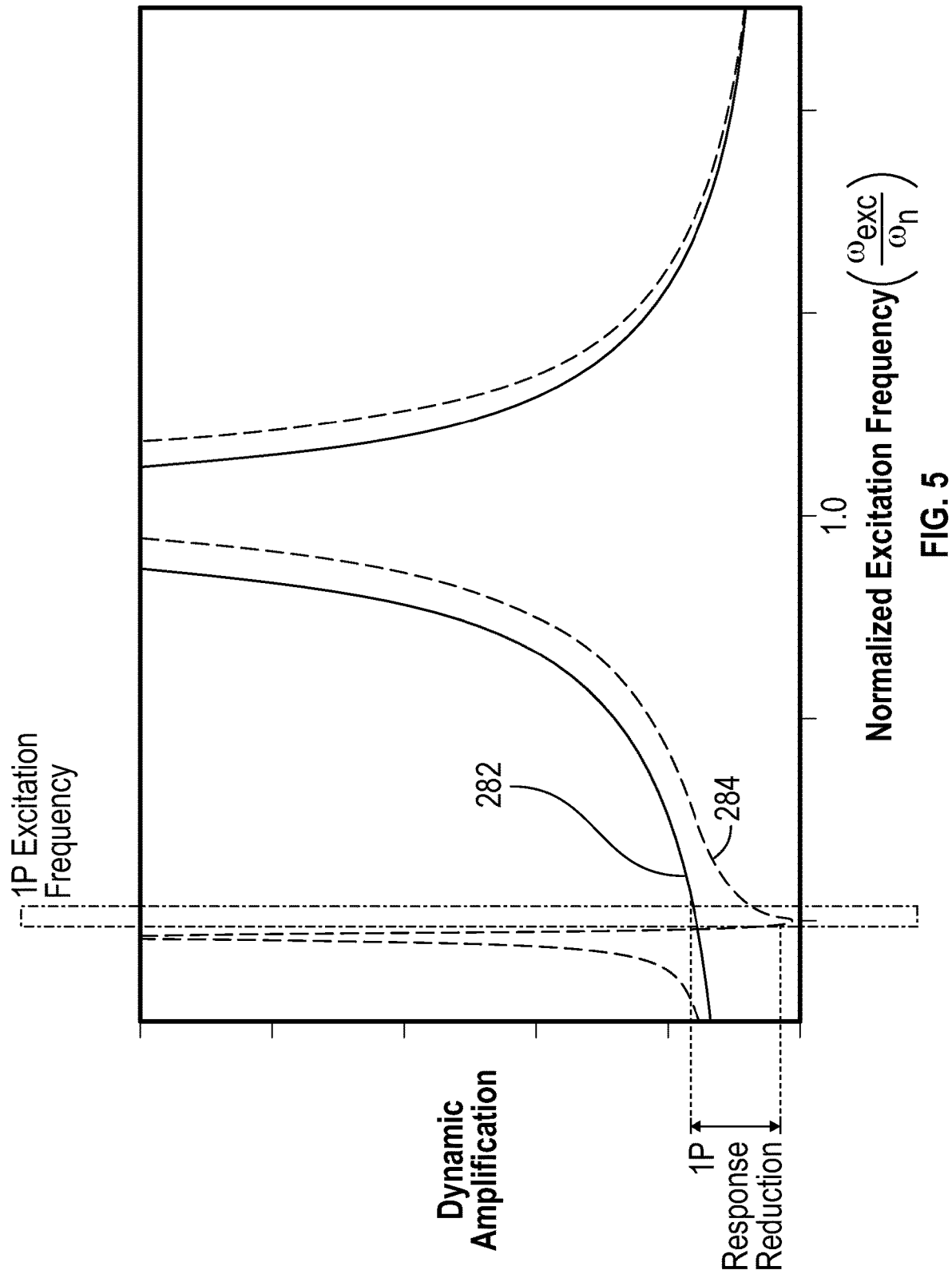
FIG. 5 is a plot of a normalized excitation frequency (frequency ratio) to a normalized dynamic amplification factor for fan blades both with a vibration absorber and without the vibration absorber.

FIG. 5 is a plot of a normalized excitation frequency (x axis) to a normalized dynamic amplification factor (y axis) for the rotating airfoil, such as rotating airfoil 202 of FIG. 4A, and similarly applicable to rotating airfoil 302, 402 and 502 of FIGS. 4B-4D. The normalized excitation frequency is, for example, a frequency ratio of the excitation frequency ($\omega_{exc}$) divided by the natural frequency (con) of the rotating airfoil 202. The dynamic response of the rotating airfoil 202 without the vibration absorber 240 to an input (excitation) frequency is shown by a solid line 282 in FIG. 5. The dynamic response of the rotating airfoil 202 with the vibration absorber 240 to an input (excitation) frequency is shown by a broken line 284 in FIG. 5. The vibration absorber 240 also has a natural frequency. In this embodiment, the natural frequency of the vibration absorber 240 is tuned to reduce the dynamic response corresponding to the 1P excitation. The natural frequency of the vibration absorber 240 is tuned to the 1P excitation frequency such that the vibration absorber 240 reduces the vibration of the primary structure (in this case the rotating airfoil 202) at the 1P excitation frequency.

In the embodiment illustrated in FIG. 5, the vibration absorber 240 reduces the dynamic amplification of the 1P load to almost no amplification. The vibration absorber 240 is tuned to have a natural frequency that is off of (e.g., greater or less than) the resonance (natural frequency) of the rotating airfoil 202. Preferably, the vibration absorber 240 is tuned to have a natural frequency that is off of the resonance (natural frequency) of the rotating airfoil 202 by at least ten percent with the natural frequency of the of the vibration absorber 240 being ninety percent or less of the natural frequency of the rotating airfoil 202 or the natural frequency of the of the vibration absorber 240 being one hundred ten percent or more of the natural frequency of the rotating airfoil 202. In some embodiments, the natural frequency of the vibration absorber 240 is less than the natural frequency of the rotating airfoil 202, and has a normalized excitation frequency less than one. The vibration absorber 240 preferably may have natural frequency from twenty-five percent of the natural frequency of the rotating airfoil 202 to ninety percent of the natural frequency of the rotating airfoil 202. As noted above, the natural frequency of the of the vibration absorber 240 may be greater than the natural frequency of the rotating airfoil 202, and, in such embodiments, the vibration absorber 240 preferably may have natural frequency from one hundred ten percent of the natural frequency of the rotating airfoil 202 to one hundred fifty percent of the natural frequency of the rotating airfoil 202.

The 1P excitation may vary as a function of the velocity of the aircraft 10 (FIG. 1) and the angle of attack of the aircraft 10. In the embodiments discussed herein, the 1P excitation is determined for a design condition where the 1P loads are the highest within the flight envelope for the aircraft 10 or engine 100 (FIG. 1). Such design conditions may be, for example, the maximum speed of the aircraft 10 and angle of attack of the aircraft 10 for takeoff and climb. In some embodiments, the 1P excitation may be the rotational speed of the rotating airfoil assembly 200, and the natural frequency of the vibration absorber 240 may be from ninety percent to one hundred ten percent the rotational speed of the rotating airfoil assembly 200. The speed of the rotating airfoil assembly 200 may be taken at the design conditions discussed above and the speed of rotating airfoil assembly 200 may be taken as a percent of the redline speed of the engine 100.

Using a vibration absorber 240 in the manner discussed herein reduced the 1P load and allows for improved rotating airfoil designs. For example, currently, both the root 212 and the spar 214 are metallic components. The vibration absorber 240 may allow lower weight materials, such as composites to be used for one or both the root 212 and the spar 214. Moreover, the size of these components may be reduced. The vibration absorber 240 changes the dynamic characteristics of the rotating airfoil 202. The vibration absorber 240, particularly, the embodiments shown in FIGS. 4A to 4C, is a passive device that can be implemented without the need of periodic maintenance. As the vibration absorber 240 is on the interior of the rotating airfoil 202 (within the body), the vibration absorber 240 does not affect the aerodynamic performance of the rotating airfoil 202.

Figure 6:
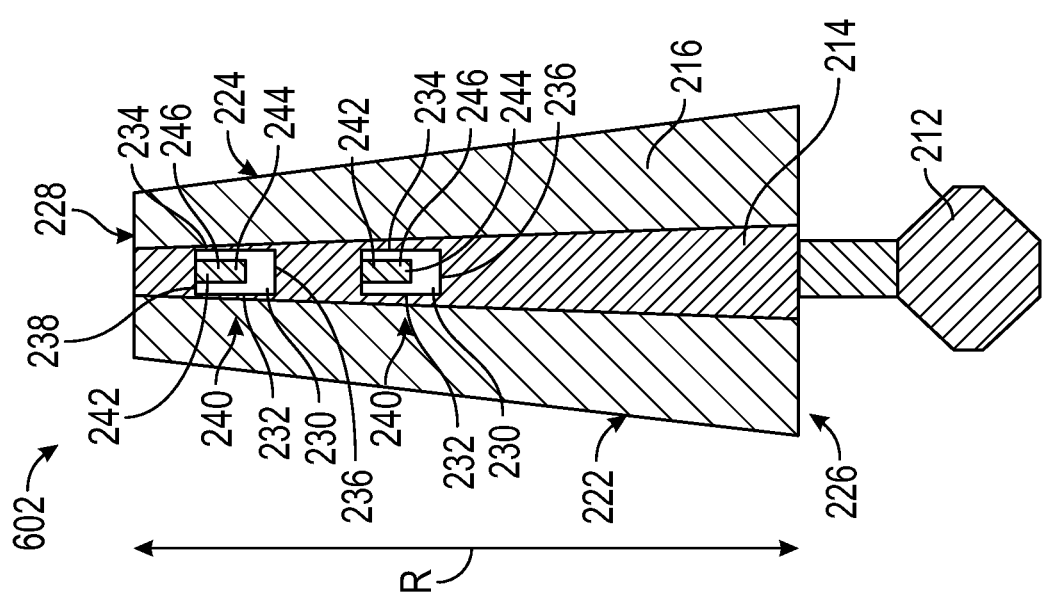
FIG. 6 is a schematic, cross-sectional view of a rotating airfoil according to another embodiment of the present disclosure.

FIG. 6 is a schematic, cross-sectional view of a rotating airfoil 602, a variation of the rotating airfoil 202 of FIG. 4A, according to still another aspect of the disclosure herein. The rotating airfoil 602 is substantially similar to the rotating airfoil 202, therefore, like parts will be identified with like numerals. It should be understood that the description of like parts of the rotating airfoil 202 applies to the rotating airfoil 602 unless otherwise noted.

A single vibration absorber 240 is used in the embodiments shown in FIGS. 4A to 4C. As illustrated in FIG. 6, other embodiments may use a plurality of vibration absorbers 240, such as in the rotating airfoil 602 shown in FIG. 6. Each vibration absorber 240 may be tuned to account for different excitation frequencies. For example, one vibration absorber 240 may be tuned to account for the 1P excitation, and another vibration absorber 240 is tuned to have a natural frequency that coincides with some other synchronous or non-synchronous stimulus. In some embodiments, a first vibration absorber 240 has a first natural frequency and a second vibration absorber 240 has a second natural frequency different from the first natural frequency. In such a case, the length L of the first vibration absorber 240 may be different than the length L of the second vibration absorber 240.

Figure 7:
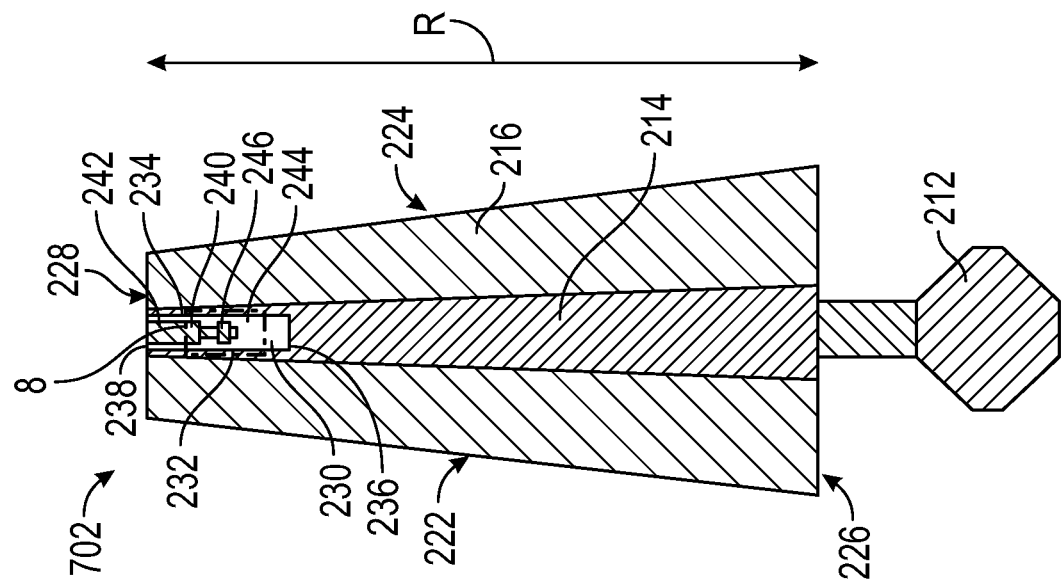
FIG. 7 is a schematic, cross-sectional view of a rotating airfoil according to another embodiment of the present disclosure.

FIG. 7 is a schematic, cross-sectional view of a rotating airfoil 702, a variation of the rotating airfoil 202 of FIG. 4A, according to still another aspect of the disclosure herein. The rotating airfoil 702 is substantially similar to the rotating airfoil 202, therefore, like parts will be identified with like numerals. It should be understood that the description of like parts of the rotating airfoil 202 applies to the rotating airfoil 602 unless otherwise noted.

The vibration absorber 240 shown in FIGS. 4A to 4C is passive, and, once it is manufactured, no further tuning or adjustment is needed. In some embodiments, the vibration absorber 240 may be adjustable to have different natural frequencies. The vibration absorber 240 shown in FIG. 7 is similar to the vibration absorber 240 shown in FIG. 4B, but the free end 244 includes an adjustable mass 246 that can be moved farther from the attached end 242 or closer to the attached end 242 of the vibration absorber 240, to change the natural frequency of the vibration absorber 240.

FIG. 8 is a detail view showing detail 8 of the vibration absorber 240 of FIG. 7. In this embodiment, the vibration absorber 240 is actively adjustable such that, for example, a user or a controller 260 moves the adjustable mass 246. Any suitable means may be used to adjust (move) the adjustable mass 246, including, for example, an actuator 250, such as a linear actuator, shown in FIG. 8. In this embodiment, the actuator 250 includes a stepper motor 252 that drives a screw 254. The stepper motor 252 rotates the screw 254, and the adjustable mass 246 moves closer to or farther from the attached end 242 of the vibration absorber 240 as the screw 254 rotates. The actuator 250 and, more specifically in this embodiment, the stepper motor 252 may be operated by a controller 260. The stepper motor 252 is communicatively and operatively coupled to the controller 260.

The controller 260 may be a standalone controller part of an engine controller configured to operate various systems of the engine 100 (FIG. 1). In this embodiment, the controller 260 is a computing device having one or more processors 262 and one or more memories 264. The processor 262 can be any suitable processing device, including, but not limited to, a microprocessor, a microcontroller, an integrated circuit, a logic device, a programmable logic controller (PLC), an application specific integrated circuit (ASIC), and/or a Field Programmable Gate Array (FPGA). The memory 264 can include one or more computer-readable media, including, but not limited to, non-transitory computer-readable media, a computer readable non-volatile medium (e.g., a flash memory), a RAM, a ROM, hard drives, flash drives, and/or other memory devices.

The memory 264 can store information accessible by the processor 262, including computer-readable instructions that can be executed by the processor 262. The instructions can be any set of instructions or a sequence of instructions that, when executed by the processor 262, cause the processor 262 and the controller 260 to perform operations. The controller 260 and, more specifically, the processor 262 is programed or configured to perform these operations, such as the operations discussed further below. In some embodiments, the instructions can be executed by the processor 262 to cause the processor 262 to complete any of the operations and functions for which the controller 260 is configured, as will be described further below. The instructions can be software written in any suitable programming language or can be implemented in hardware. Additionally, and/or alternatively, the instructions can be executed in logically and/or virtually separate threads on the processor 262. The memory 264 can further store data that can be accessed by the processor 262.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 260 may be communicatively coupled to a sensor 266 that measures excitation frequencies (or another input from which the controller 260 can determine an execution frequency). The controller 260 may be configured to receive an input from the sensor 266 indicating the measured excitation frequency, and the controller 260 is configured to move the adjustable mass 246 based on the measured excitation frequency. The controller 260 may be configured to move the adjustable mass 246 to tune the vibration absorber 240 to the measured excitation frequency. Additionally, or alternatively, the controller 260 may be configured to receive inputs indicating an operating condition of the rotating airfoil assembly 200. The operating condition of the rotating airfoil assembly 200 may be an operating condition of the engine 100 and/or an operating condition of the aircraft 10, such as the angle of attack of the aircraft 10, the airspeed of the aircraft 10, or the rotational velocity of the rotating airfoil assembly 200. The controller 260 may be configured to move the adjustable mass 246 and to tune the vibration absorber 240 based on the operating condition of the rotating airfoil assembly 200.

FIG. 9 is a detail view showing an alternate configuration of the vibration absorber 240, and more particularly, an alternate configuration of the adjustable mass 246. In this embodiment, the adjustable mass 246 is passively tunable (adjustable). The adjustable mass 246 of this embodiment is slidably connected to a rod 272. The adjustable mass 246 is connected to the attached end 242 of the vibration absorber 240 by a spring 274. The location of the adjustable mass 246 on the rod 272, and thus the natural frequency of the vibration absorber 240, is controlled by the centrifugal load on the mass and the spring constant. The position of the adjustable mass 246 on the rod 272 and the distance of the adjustable mass 246 from the attached end 242 may thus be based on the rotational speed of the rotating airfoil assembly 200 and, more specifically, the rotating airfoil, such as rotating airfoil 202, 302, 402, 502, 602, 702.

The rotating airfoils 202, 302, 402, 502, 602, 702 discussed herein utilize a vibration absorber 240 that is tuned to account for off of the resonance (natural frequency) excitations. In embodiments discussed above, the vibration absorber 240 was tuned to account for the 1P excitation. The vibration absorber 240 may be tuned to account for other excitations that are off of the resonance (natural frequency) of the rotating airfoil, and in these embodiments, the natural frequency of the vibration absorber 240 is different than the natural frequency of the rotating airfoil. The vibration absorber 240 reduces the vibrations caused by off of the resonance (natural frequency) excitations and, more specifically in some embodiments, the 1P excitation, and thereby reduces fatigue and other stresses and strains on the rotating airfoil 202, 302, 402, 502, 602, 702 and the rotating airfoil assembly 200.

Further aspects of the present disclosure are provided by the subject matter of the following clauses.

A rotating airfoil includes a body and a vibration absorber. The body has a root end and a tip. The vibration absorber is located within the body. The rotating airfoil has a natural frequency. The vibration absorber has a natural frequency. The natural frequency of the vibration absorber is different than the natural frequency of the rotating airfoil.

The rotating airfoil of the preceding clause, wherein the natural frequency of the vibration absorber is different than the natural frequency of the rotating airfoil by at least ten percent.

The rotating airfoil of any preceding clause, wherein the natural frequency of the vibration absorber is from twenty-five percent of the natural frequency of the rotating airfoil to ninety percent of the natural frequency of the rotating airfoil.

The rotating airfoil of any preceding clause, wherein the vibration absorber is actively adjustable. The vibration absorber is operatively coupled to a controller. The controller is programmed to adjust the natural frequency of the vibration absorber based on an input.

The rotating airfoil of any preceding clause, wherein the vibration absorber is passively adjustable. The vibration absorber includes an adjustable mass movable to change the natural frequency of the vibration absorber. The position of the adjustable mass is based on the rotational speed of the rotating airfoil.

The rotating airfoil of any preceding clause, further including a plurality of vibration absorbers. The plurality of vibration absorbers includes a first vibration absorber having a first natural frequency and a second vibration absorber having a second natural frequency different from the first natural frequency. The first natural frequency and the second natural frequency are different than the natural frequency of the rotating airfoil.

The rotating airfoil of any preceding clause, wherein the body includes foam. The vibration absorber is located within the foam.

The rotating airfoil of any preceding clause, further including a spar. The spar is a portion of the body and the vibration absorber is located within the spar.

The rotating airfoil of any preceding clause, further including a cavity formed in the spar. The vibration absorber is located within the cavity.

The rotating airfoil of any preceding clause, wherein the rotating airfoil has a longitudinal direction. The spar extending to the tip. The cavity is a bore extending inward from the tip in the longitudinal direction of the rotating airfoil.

The rotating airfoil of any preceding clause, further including a cavity formed in the body. The cavity including a plurality of walls defining the cavity and the vibration absorber is located within the cavity. The vibration absorber is a cantilevered beam having an attachment end and a free end. The attachment end is attached to at least one wall of the plurality of walls defining the cavity. The vibration absorber is sized and positioned within the cavity such that the free end is able to vibrate within the cavity when subjected to an excitation frequency.

The rotating airfoil of any preceding clause, wherein the rotating airfoil has a longitudinal direction. Each of the cavity and the vibration absorber is elongated in the longitudinal direction.

The rotating airfoil of any preceding clause, wherein the free end includes an adjustable mass movable with respect to the attached end to change the natural frequency of the vibration absorber.

The rotating airfoil of any preceding clause, wherein the vibration absorber is sized and positioned within the cavity such that a gap is formed between the vibration absorber and sidewalls of the cavity.

The rotating airfoil of any preceding clause, wherein the gap is sized such that the free end of the vibration absorber is able vibrate within the cavity, without contacting the sidewalls of the cavity, when the rotating airfoil is subjected to an excitation frequency that is less than the natural frequency of the rotating airfoil.

A rotating airfoil assembly including a rotation axis and a plurality of the rotating airfoils of any preceding clause. The plurality of the rotating airfoils is rotatable about the rotation axis.

A rotating airfoil assembly of the preceding clause, wherein the rotating airfoil assembly produces an excitation frequency because of asymmetric loading of the rotating airfoils when the rotation axis is at an angle relative to an airflow direction of air flowing into the plurality of the rotating airfoils. The natural frequency of the vibration absorber is the excitation frequency.

A rotating airfoil assembly of any preceding clause, wherein the plurality of the rotating airfoils is rotatable about the rotation axis at a rotational speed. The natural frequency of the vibration absorber is from ninety percent to one hundred ten percent the rotational speed.

An engine including the rotating airfoil assembly of any preceding clause. The torque producing system is coupled to the rotating airfoil assembly to rotate the rotating airfoil assembly about the rotation axis of the rotating airfoil assembly.

The engine of any preceding clause, wherein the engine is an unducted single fan engine. The torque producing system is a turbomachine of a gas turbine engine. The rotating airfoil assembly is a fan with each of the plurality of rotating airfoils is a fan blade.

Although the foregoing description is directed to the preferred embodiments, other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A rotating airfoil comprising:
   a body having a root end and a tip;
   a cavity formed in the body, the cavity including a plurality of walls defining the cavity; and
   a vibration absorber located within the cavity and arranged in the cavity to move within the cavity without contacting the walls of the cavity when an excitation frequency is applied to the rotating airfoil,
   wherein the rotating airfoil has a natural frequency, and the vibration absorber has a natural frequency, the natural frequency of the vibration absorber being different than the natural frequency of the rotating airfoil by at least ten percent.

2. The rotating airfoil of claim 1, wherein the natural frequency of the vibration absorber is from twenty-five percent of the natural frequency of the rotating airfoil to ninety percent of the natural frequency of the rotating airfoil.

3. The rotating airfoil of claim 1, wherein the vibration absorber is actively adjustable, the vibration absorber being operatively coupled to a controller, and the controller being programmed to adjust the natural frequency of the vibration absorber based on an input.

4. The rotating airfoil of claim 1, wherein the vibration absorber is passively adjustable, the vibration absorber including an adjustable mass movable to change the natural frequency of the vibration absorber, the position of the adjustable mass being based on the rotational speed of the rotating airfoil.

5. The rotating airfoil of claim 1, wherein the vibration absorber is a first vibration absorber having a first natural frequency, and the rotating airfoil further comprises a second vibration absorber having a second natural frequency different from the first natural frequency, wherein the first natural frequency and the second natural frequency are different than the natural frequency of the rotating airfoil.

6. The rotating airfoil of claim 1, wherein the body includes foam, the vibration absorber being located within the foam.

7. The rotating airfoil of claim 1, further comprising a spar, the spar being a portion of the body and the vibration absorber being located within the spar.

8. The rotating airfoil of claim 7, wherein the cavity is formed in the spar.

9. The rotating airfoil of claim 8, wherein the rotating airfoil has a longitudinal direction, the spar extending to the tip and the cavity being a bore extending inward from the tip in the longitudinal direction of the rotating airfoil.

10. The rotating airfoil of claim 1, wherein the vibration absorber is a cantilevered beam having an attachment end and a free end, the attachment end being attached to at least one wall of the plurality of walls defining the cavity, the vibration absorber being sized and positioned within the cavity such that the free end is able to vibrate within the cavity when subjected to an excitation frequency.

11. The rotating airfoil of claim 10, wherein the rotating airfoil has a longitudinal direction, each of the cavity and the vibration absorber being elongated in the longitudinal direction.

12. The rotating airfoil of claim 10, wherein the free end includes an adjustable mass movable with respect to the attached end to change the natural frequency of the vibration absorber.

13. The rotating airfoil of claim 10, wherein the vibration absorber is sized and positioned within the cavity such that a gap is formed between the vibration absorber and sidewalls of the cavity.

14. The rotating airfoil of claim 13, wherein the gap is sized such that the free end of the vibration absorber is able vibrate within the cavity, without contacting the sidewalls of the cavity, when the rotating airfoil is subjected to an excitation frequency that is less than the natural frequency of the rotating airfoil.

15. A rotating airfoil assembly comprising:
a rotation axis; and
a plurality of rotating airfoils of claim 1, the plurality of the rotating airfoils being rotatable about the rotation axis.

16. A rotating airfoil assembly of claim 15, wherein the rotating airfoil assembly produces an excitation frequency because of asymmetric loading of the plurality of rotating airfoils when the rotation axis is at an angle relative to an airflow direction of air flowing into the plurality of the rotating airfoils, the natural frequency of the vibration absorber being the excitation frequency.

17. A rotating airfoil assembly of claim 15, wherein the plurality of the rotating airfoils is rotatable about the rotation axis at a rotational speed, the natural frequency of the vibration absorber being from ninety percent to one hundred ten percent of the rotational speed.

18. An engine comprising:
the rotating airfoil assembly of claim 15; and
a torque producing system coupled to the rotating airfoil assembly to rotate the rotating airfoil assembly about the rotation axis of the rotating airfoil assembly.

19. The engine of claim 18, wherein the engine is an unducted single fan engine, the torque producing system being a turbomachine of a gas turbine engine, and the rotating airfoil assembly being a fan with each of the plurality of rotating airfoils being a fan blade.

* * * * *